US011898384B2

(12) United States Patent
Couto Maquieira et al.

(10) Patent No.: US 11,898,384 B2
(45) Date of Patent: Feb. 13, 2024

(54) MOTOR VEHICLE DOOR EXTERNAL OPENING CONTROL

(71) Applicant: AKWEL VIGO SPAIN SL, Pontevedra (ES)

(72) Inventors: Delmiro Javier Couto Maquieira, Pontevedra (ES); Jose Oscar Vazquez Carballo, Vigo (ES); Julio Garcia Rodriguez, Pontevedra (ES)

(73) Assignee: AKWEL VIGO SPAIN SL, Vigo (ES)

( * ) Notice: Subject to any disclaimer, the term of this patent is extended or adjusted under 35 U.S.C. 154(b) by 0 days.

(21) Appl. No.: 17/197,683

(22) Filed: Mar. 10, 2021

(65) Prior Publication Data

US 2021/0285264 A1 Sep. 16, 2021

(30) Foreign Application Priority Data

Mar. 10, 2020 (FR) ...................................... 2002350

(51) Int. Cl.
*E05B 85/10* (2014.01)
*E05B 83/36* (2014.01)

(52) U.S. Cl.
CPC ............ *E05B 85/107* (2013.01); *E05B 83/36* (2013.01); *E05B 85/103* (2013.01)

(58) Field of Classification Search
CPC ............. Y10T 70/5761; Y10T 70/7955; Y10T 70/796; Y10T 70/7977; Y10T 70/7983; Y10T 70/8649; Y10T 292/57; E05B 17/14; E05B 17/18; E05B 17/183; E05B 17/185; E05B 85/10; E05B 85/107; E05B 85/103; E05B 83/36; E05B 17/181
USPC ...................................................... 292/336.3
See application file for complete search history.

(56) References Cited

U.S. PATENT DOCUMENTS 7,387,004 B2 * 6/2008 Schutz .................. E05B 85/107 70/455
8,359,889 B2 * 1/2013 Katagiri .................. E05B 17/18 70/423
8,904,835 B2 * 12/2014 Bohm ..................... E05B 81/77 70/279.1

(Continued)

FOREIGN PATENT DOCUMENTS

DE 197 31 325 A1 1/1999
DE 10128866 A1 * 12/2002 ........... E05B 17/183

(Continued)

*Primary Examiner* — Kristina R Fulton
*Assistant Examiner* — Emily G. Brown
(74) *Attorney, Agent, or Firm* — Oliff PLC

(57) ABSTRACT

An opening control of a motor vehicle opening has a housing, a handle rotatably housed completely or partially in the housing, in an ejected position the handle extends at least partially from the housing, the handle actuating a door lock, a lock cylinder adjacent to the door handle, and a flap articulated to the housing and to cover the lock cylinder while being flush with the handle, and, when the flap is actuated by hand, exposes the lock cylinder; the flap articulated about an axis of rotation extending with respect to the lateral edge of the handle to a distance greater than or equal to 10 mm and the lateral edge of the handle includes a gripping device, capable of receiving a member inserted between the open flap and the lateral edge of the handle enabling the manual actuation of the handle from the flush position to the ejected position.

17 Claims, 6 Drawing Sheets

(56) References Cited

U.S. PATENT DOCUMENTS

| | | | | |
|---|---|---|---|---|
| 8,985,648 | B2 * | 3/2015 | Muller | E05B 85/107 292/DIG. 31 |
| 8,991,227 | B2 * | 3/2015 | Muller | E05B 85/107 292/DIG. 31 |
| 10,030,413 | B2 * | 7/2018 | Kamimura | E05B 85/16 |
| 10,145,152 | B2 * | 12/2018 | Beck | E05B 17/14 |
| 2007/0193320 | A1 * | 8/2007 | Niskanen | E05B 17/185 70/423 |
| 2008/0190157 | A1 * | 8/2008 | Mizuno | E05B 17/183 70/455 |
| 2010/0320779 | A1 * | 12/2010 | Yoo | E05B 1/0015 292/336.3 |
| 2012/0074717 | A1 * | 3/2012 | Macfarlane | E05B 1/0069 292/336.3 |
| 2012/0205925 | A1 * | 8/2012 | Muller | E05B 85/107 292/336.3 |
| 2012/0216582 | A1 * | 8/2012 | Muller | E05B 79/06 70/91 |
| 2013/0170241 | A1 * | 7/2013 | Lesueur | E05B 77/42 70/91 |
| 2014/0047877 | A1 * | 2/2014 | Bohm | E05B 81/16 70/357 |
| 2014/0125071 | A1 * | 5/2014 | McWilliams | E05B 17/183 292/336.3 |
| 2016/0273247 | A1 * | 9/2016 | Fujiwara | G05G 9/02 |
| 2019/0242165 | A1 * | 8/2019 | Gebel | E05C 19/04 |

FOREIGN PATENT DOCUMENTS

| | | | |
|---|---|---|---|
| DE | 10 2009 045 843 | A1 | 4/2011 |
| DE | 10 2009 045 874 | A1 | 4/2011 |
| EP | 1 985 784 | A1 | 10/2008 |
| FR | 3 078 990 | A1 | 9/2019 |

* cited by examiner

MOTOR VEHICLE DOOR EXTERNAL OPENING CONTROL

TECHNICAL FIELD

The present invention relates, generally, to motor vehicle door external opening controls and, more particularly, to a so-called “flush” motor vehicle side door external opening control, i.e. an opening control wherein the handle is flush with the body of the door or opening.

PRIOR ART

In the field of motor vehicles, and more particularly in that of openings, it is well known that an external opening control comprises a fixed support intended to be mounted on the opening and a handle movably mounted on the support, for example pivotally mounted on the support by being articulated in rotation about an axis.

The opening control also comprises an unlocking mechanism, which when the handle is pulled, enables the unlocking of the lock and thus the opening of the door. The lock conventionally comprises a bolt rigidly connected to the door capable of cooperating with a catch rigidly connected to the body. When opening the door from outside the vehicle, the bolt is released from the catch by actuating the external opening control.

The invention relates more particularly to a “flush” type handle opening control, i.e. the support whereon the handle is movably mounted forms a cavity capable of receiving the handle in the retracted configuration. In this retracted configuration, the outer surface of the handle is flush with the outer surface of the outer wall of the opening. In the extended or deployed configuration, the handle extends at least partially from the cavity of the support so as to be capable of being gripped by a user of the vehicle with a view to opening the door. To do this, the user can move the handle more outwards in order to control the door lock. In general, the opening control comprises an electrical handle ejection mechanism to make it possible for the user to grip the handle and open the opening. The electrical ejection mechanism operates using an electrical power supply delivered, for example, by a battery of the motor vehicle and can be controlled electronically remotely using a key, a mobile phone or any other device allowing remote communication.

However, in the event of failure of this electrical power supply, the electrical ejection handle is not usable and the user cannot enter the vehicle. It is therefore necessary to have a backup mechanism for unlocking the vehicle door, particularly when the battery does not have enough power for the electrical ejection mechanism to work.

In order to remedy this drawback, an opening control comprising mechanical backup unlocking means has already been devised. This is the case in particular of the French patent application FR3078990.

The document FR3078990 describes an opening control of a motor vehicle opening of the type comprising a housing intended to be mounted on the opening, a handle rotatably mounted with respect to the housing between at least a flush position wherein the handle is housed completely or partially in the housing and an ejected position wherein the handle extends at least partially from the housing, the control comprising a mechanism configured to be triggered mechanically in response to a pushing action of the handle into the housing, the end of the pushing action being capable of triggering the mechanism and the mechanism being configured to automatically move the handle along all or part of a travel from a pushed-in position of the handle to the flush position passing via the ejected position.

Although this manual actuation mechanism makes it possible to eject the handle without electrical assistance, it does not allow access to the key-operated lock cylinder.

The documents DE19731325, EP1985784 and US2014047877 are also known.

The document DE19731325 describes a handle for opening a vehicle door disposed in such a way that the outside of the handle is flush with the outer contour of the door and that the handle can be switched to open the door into an opening position wherein the handle protrudes with respect to the outer contour of the door. An adjustment unit is capable of moving the handle via an external power supply in this opening position. A cylinder lock which is accessible from outside is also disposed next to the handle.

This type of door handle assembly has the disadvantage that the cylinder lock cannot be attached in a concealed manner, such that the aesthetic advantages of a flush handle are partially lost.

The document EP1985784 describes a motor vehicle door external opening control, of the type integrated and concealed in the vicinity of a strut of the vehicle body, the control comprising an operating member of the paddle type pivotally mounted about an axis of rotation between an idle position flush with the body and a switched position enabling manual gripping with a view to opening the door. Said paddle is coupled with an internal mechanism of the control and a lifting button disposed adjacently to the paddle being associated therewith. Said lifting button also has an idle position flush with the body and a mechanical link being produced between the lifting button and the paddle such that pressing the lifting button triggers a start of pivoting of the paddle from the idle position thereof. Said control comprises a locking lever pivotally mounted under the paddle and subjected to the action of a return spring, keeping said paddle locked, while the lifting button includes a boss which cooperates with the locking lever to actuate it, and thus release the paddle.

This type of opening control also has the disadvantage that the cylinder lock cannot be attached in a concealed manner, such that the handle coupled with the cylinder lock is unsightly.

The document U52014047877 describes a door handle assembly comprising a door handle flush with the body and a lock cylinder cover plate, said cover plate being flush with the body and comprising a flap and a front plate. The surfaces of the door handle and of the front plate extend in a common plane with the door. In the event of battery failure, the flap can be pivoted by hand to expose the lock cylinder and thus enable the insertion of a mechanical key and simultaneously the opening of the door handle. When the cover plate and the flap are pivoted by 90° with respect to the normal position, the flap acts upon a lever such that the door handle is moved to the operating position. The flap thus rotates a lever about a pivoting axis which in turn pushes a manual deployment lever, which can pivot about another pivoting axis.

This type of handle assembly has the advantage of being completely flush with the door body, including the flap concealing the lock cylinder. However, it has the drawback of comprising a large number of parts, more particularly the system for actuating the door handle according to the rotation of the flap concealing the lock cylinder.

DISCLOSURE OF THE INVENTION

One of the aims of the invention is therefore that of remedying these drawbacks by providing a vehicle opening external opening control of simple and inexpensive design, comprising a limited number of parts and making it possible to open the opening including in the absence of electrical power supply.

For this purpose, and according to the invention, a control for opening a motor vehicle opening is proposed comprising a housing intended to be mounted on the opening, a handle configured to actuate a door lock and rotatably mounted with respect to the housing between at least a flush position wherein the handle is housed completely or partially in the housing and an ejected position wherein the handle extends at least partially from the housing, a lock cylinder adjacent to a lateral edge of the handle to lock and unlock the lock, and a flap articulated to the housing and configured to cover the lock cylinder while being flush with the handle in a closing position, and, when the flap is actuated by hand, exposes the lock cylinder in an opening position, characterised in that the flap is articulated to the housing about an axis of rotation extending away from the lateral edge of the handle in such a way that the flap can pivot towards the inside of the housing in the opening position thereof between the edge of the handle and the cylinder in order to free a space between the lateral edge of the handle and the open flap and in that the lateral edge of the handle includes a gripping means, made accessible by the freeing of said space in the flap opening position, capable of receiving a member inserted into the space freed between the open flap and the lateral edge of the handle in order to enable the manual actuation of said handle from the flush position thereof to the ejected position thereof after opening the flap.

It is clearly understood that, unlike the devices of the prior art, the opening control according to the invention includes a very limited number of parts, enables completely flush integration, not only of the opening handle but also of the lock cylinder, in the opening and makes it possible to open the opening including in the absence of electrical power supply, in the event of battery failure for example.

In a preferred embodiment, in the opening position thereof, the flap extends in a configuration erected inside the housing between the lateral edge of the handle and the lock cylinder, protruding partially from the housing.

In a preferred embodiment, the axis of rotation is positioned on the flap in order to delimit a front flap part, upstream from the axis, forming a cylinder cover, and a rear flap part, downstream from the axis, forming a flap pivoting lever.

In a preferred embodiment, the housing comprises a cylinder housing compartment including a support structure whereon the flap is rotatably mounted about the axis of rotation thereof such that, in the flap closing position, the front part closes the compartment and the rear part closes said space capable of being freed.

In an embodiment of the invention, the housing comprises an inner clearance extending between the lateral edge of the handle and the cylinder wherein the flap can pivot in the opening position thereof in an erected configuration between the cylinder and the lateral edge of the handle freeing said space to allow access to the lateral edge of the handle.

In an embodiment of the invention, in the closing position, the flap extends flush in the longitudinal extension of the handle in the flush position thereof.

In an embodiment of the invention, the flap extends adjacent to the handle.

In an embodiment of the invention, the space freed between the lateral edge and the open flap is sized to allow the insertion of an adult user's finger.

In an embodiment of the invention, the distance separating the lateral edge of the handle and the axis of rotation of the flap is greater than or equal to 10 mm, preferably greater than 15 mm.

In a preferred embodiment of the invention, the control includes a switch electrically connected to a vehicle BCM and positioned in a recess extending to the rear of the housing, next to the flap, above the lock cylinder, cooperating with a push-button protruding on the front face of the housing under the flap which includes on the so-called inner face thereof a finger capable of bearing on the push-button when the flap is in the closed and/or pushed-in position.

In a preferred embodiment, said control is thus remarkable in that the flap is articulated about an axis of rotation extending with respect to the lateral edge of the handle to a distance for example greater than or equal to 10 mm.

Preferably, the gripping means consists of a hollow formed in the lateral edge of the handle extending next to the axis of rotation of the flap and capable of receiving at least one finger for manually opening the handle.

Moreover, the axis of rotation of the handle is parallel with the axis of rotation of the flap.

Furthermore, the axis of rotation of the flap includes an elastic return means of the flap in the closing position thereof.

Said return means consists, preferably, of a torsion spring.

Preferably, the distance separating the lateral edge of the handle and the axis of rotation of the flap is greater than or equal to 15 mm.

According to a preferred embodiment, the hollow formed in the lateral edge of the handle has a substantially parallelepipedal shape and the hollow formed in the lateral edge of the handle has a depth greater than or equal to 6 mm.

BRIEF DESCRIPTION OF THE DRAWINGS

Further advantages and features will emerge more clearly from the following description of a single alternative mode of execution, given by way of non-limiting example, of the vehicle door external opening control according to the invention, with reference to the appended drawings wherein.

EMBODIMENT OF THE INVENTION

Figure 9:
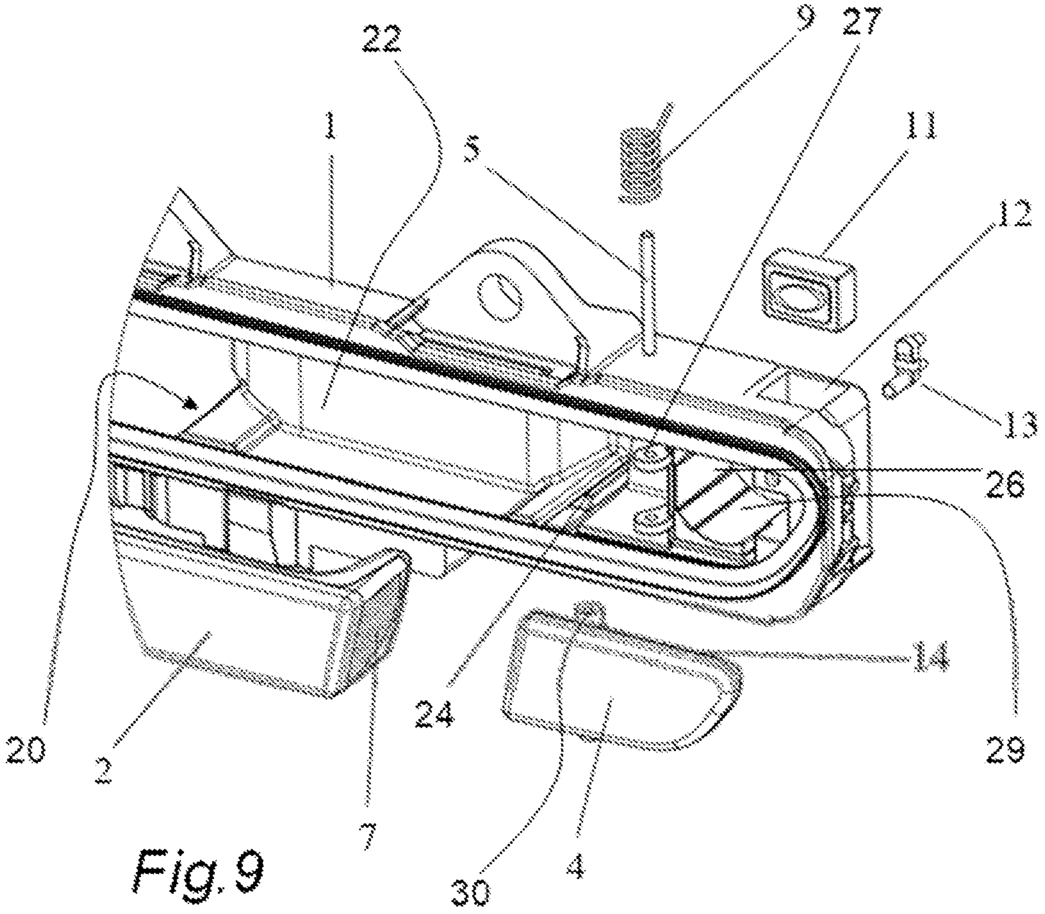
FIG. 9 is an exploded partial perspective view of the alternative mode of execution of the external opening control according to the invention represented in FIG. 7.
Figure 10:
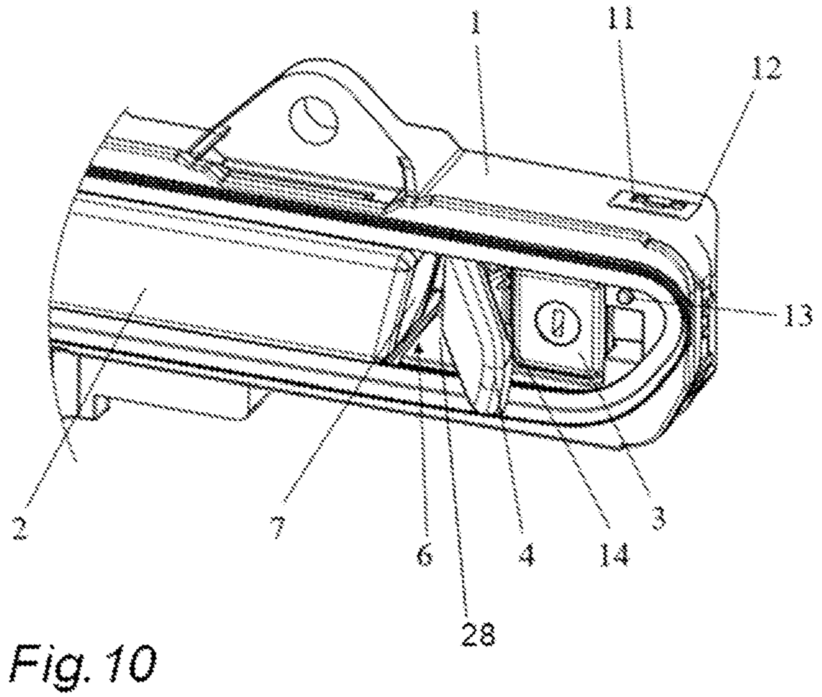
FIG. 10 is a partial perspective view of the alternative mode of execution of the external opening control according to the invention represented in FIGS. 8 and 9, in the lock cylinder cover opening position.
Figure 11:
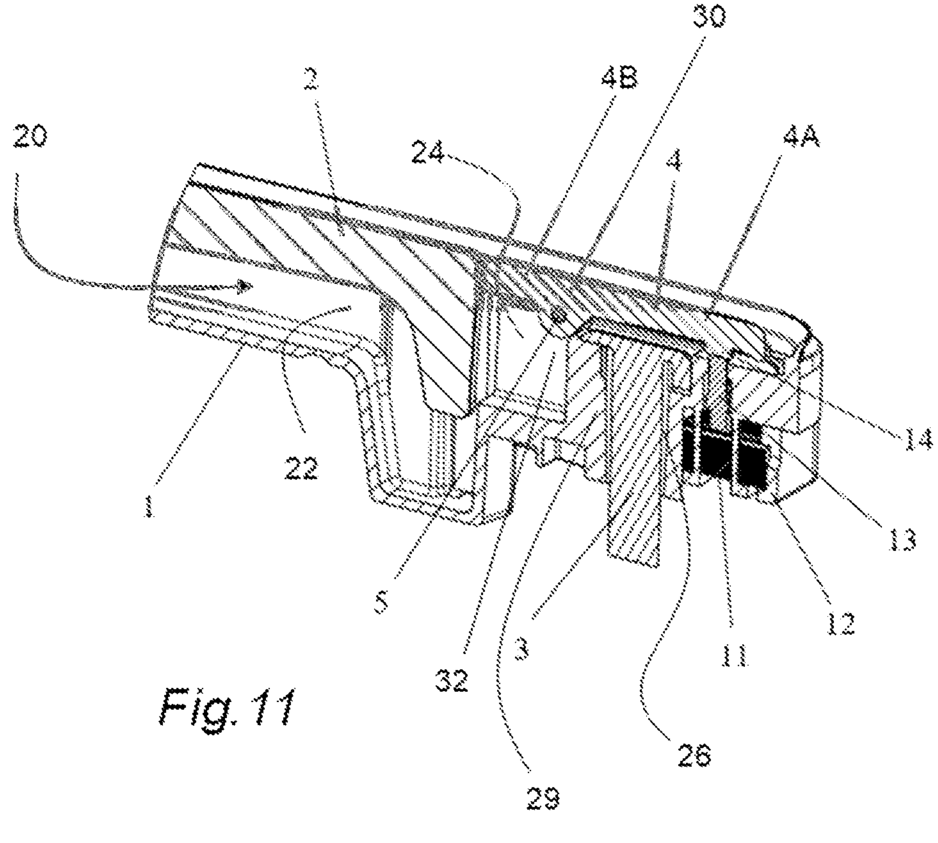
FIG. 11 is a perspective and longitudinal cross-sectional view of the alternative mode of execution of the external opening control according to the invention represented in FIGS. 8 to 10, at the level of the lock cylinder cover.

Hereinafter in the description of the opening control according to the invention, the same reference numbers denote the same elements. Moreover, the different views are not necessarily plotted to scale. Furthermore, FIGS. 9 to 11 illustrate an embodiment detail of the opening control, not present in FIGS. 1 to 8, which will be described in the form of an alternative embodiment. However, the description of the opening control in its main aspects of the invention will be carried out with reference to all of FIGS. 1 to 11.

Figure 1:
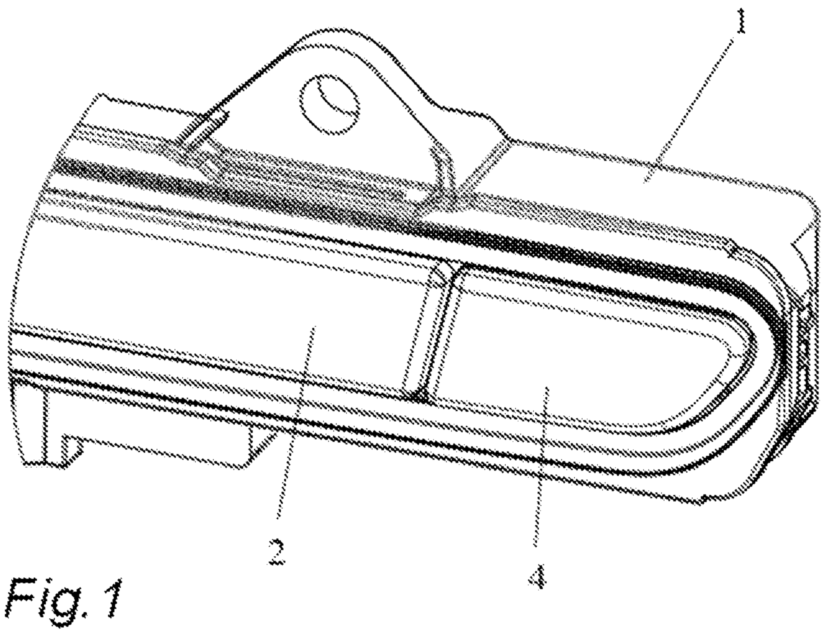
FIG. 1 is a partial perspective view of the external opening control according to the invention in the closed position.
Figure 2:
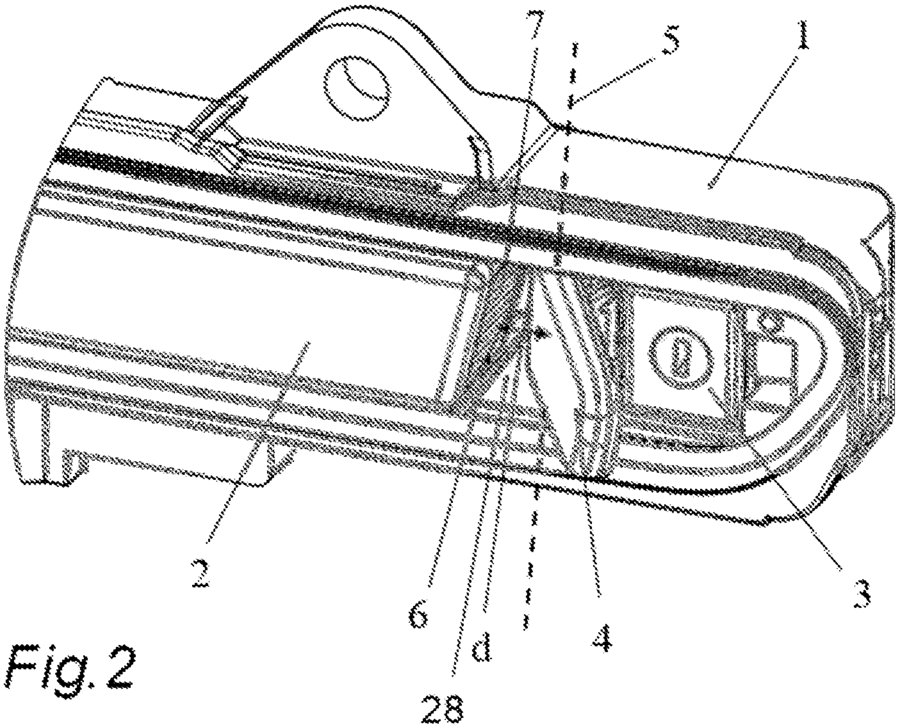
FIG. 2 is a partial perspective view of the external opening control according to the invention in the lock cylinder cover opening position.

With reference to FIGS. 1 and 2, the opening control of a motor vehicle opening according to the invention comprises a housing 1 intended to be mounted on a vehicle opening, not shown in the figures, a handle 2 rotatably mounted with respect to the housing 1 between at least a flush position wherein the handle 2 is housed completely or partially in the housing 1 and an ejected position wherein the handle 2 extends at least partially from the housing 1, said handle 2 being configured to actuate a door lock in a manner known to a person skilled in the art and therefore not shown in the figures. In the flush position thereof, as illustrated in the figures, the handle 2 extends inside the housing 1 along a longitudinal direction.

Moreover, the opening control of an opening according to the invention also comprises a lock cylinder 3 adjacent to the door handle 2 to lock and unlock the door handle (not shown in the figures).

Moreover, the opening control further comprises a flap 4 articulated to the housing 1 and configured to cover the lock cylinder 3 while being flush with the handle 2 in a closing position (FIG. 1), and, when the flap 4 is actuated by hand, exposes the lock cylinder 3 in an opening position (FIG. 2).

Figure 3:
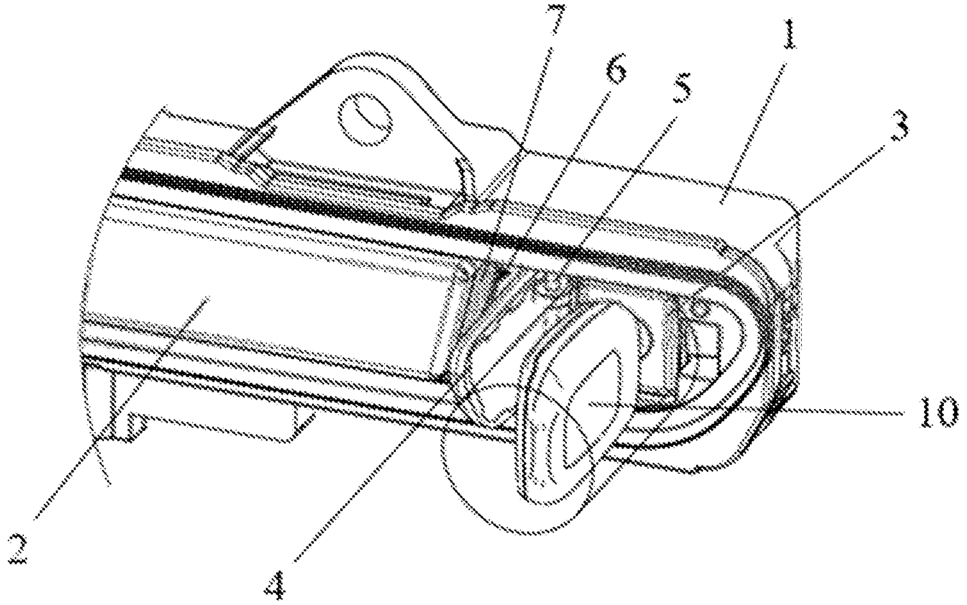
FIG. 3 is a partial perspective view of the external opening control according to the invention in the lock cylinder cover opening position with a key inserted in said lock cylinder.

Preferably, the flap 4 is configured thus to adopt the cover closing position of the cylinder 3 and the exposure opening position of the cylinder 3 enabling the actuation of the door lock (FIG. 3).

As illustrated in FIG. 2, said flap 4 is for example articulated about an axis of rotation extending with respect to the lateral edge of the handle 2 to a distance d greater than or equal to 10 mm, and preferably greater than or equal to 15 mm, i.e. greater than or equal to the thickness of a finger.

In the preferred embodiment of the invention, said flap 4 is articulated about the axis of rotation 5 in such a way that the flap 4 can be opened by pivoting inside the housing 1, between the edge of the handle 2 and the cylinder 3, in order to free a free space 28 between the lateral edge of the handle 2 and the open flap 4.

The lateral edge of the handle 2 includes a gripping means 6 capable of receiving a member, such as a finger for example, inserted between the open flap 4 and the lateral edge of the handle 2 in order to enable the manual actuation of said handle 2 from the flush position thereof to the ejected position thereof after opening the flap 4 as detailed hereinafter.

Preferably, the gripping means 6 is made accessible by freeing said space 28 in the opening position of the flap 4 and is capable of receiving a member inserted in the freed space 28 between the open flap 4 and the lateral edge of the handle 2 so as to enable the manual actuation of said handle 2 from the flush position thereof to the ejected position thereof after opening the flap 4.

Thus, the freeing of the space 28 between the lateral edge of the handle 2 and the open flap 4, makes the lateral edge of the handle 2 accessible, and enables the manual actuation of said handle 2, by gripping the lateral edge thereof, from the flush position thereof to the ejected position thereof.

Preferably, the freed space 28 is sized to enable the insertion of an adult user's finger. To this end, in this preferred embodiment of the invention, said flap 4 is articulated about an axis of rotation 5 extending with respect to the lateral edge of the handle 2 to a distance d greater than or equal to 10 mm, and preferably greater than or equal to 15 mm, i.e. greater than or equal to the thickness of a finger.

Said gripping means, with reference to FIG. 2, consists of a hollow 7 formed in the lateral edge of the handle 2 extending next to the axis of rotation 5 of the flap 4 and capable of receiving at least one finger for manually opening the handle 2. In this particular embodiment example, said hollow 7 formed in the lateral edge of the handle 2 has a substantially parallelepipedal shape and a depth greater than or equal to 6 mm.

It is obvious that said hollow 7 may have any shape without for all that leaving the scope of the invention.

Preferably, as seen for example in FIG. 1, in the closing position, the flap 4 extends flush in the longitudinal extension of the handle 2. The flap 4 is preferably as can be seen 1, adjoined to the handle 2.

In the ejected opening position thereof, preferably as seen clearly in FIGS. 2, 5 to 7, the flap 4 extends in a configuration erected inside the housing 1, between the lateral edge of the handle 2 and the lock cylinder 3, protruding partially from the housing 1.

Moreover, in this particular embodiment example, the axis of rotation 5 of the handle 2 is substantially vertical and the axis of rotation of the handle 2 is parallel with the axis of rotation 5 of the flap 4, the axis of rotation 5 of the flap 4 being thus substantially vertical.

However, it is obvious that the axis of rotation of the handle 2 may also be horizontal, i.e. perpendicular to the axis of rotation 5 of the flap 4 without for all that leaving the scope of the invention.

Figure 4:
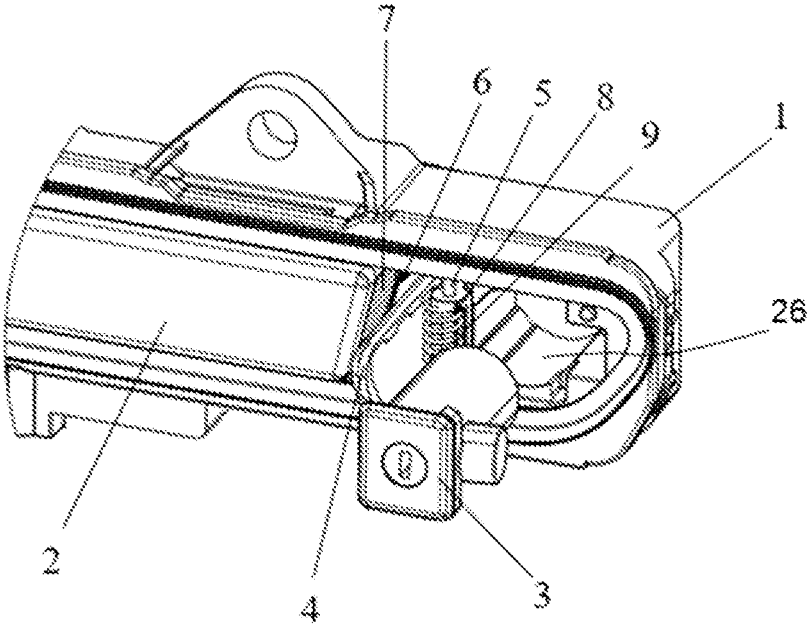
FIG. 4 is a partial and exploded perspective view of the external opening control according to the invention in the lock cylinder cover opening position when positioning the lock cylinder.

Furthermore, preferably, as illustrated in FIGS. 3 and 4, the lock cylinder 3 comprises a body of general cylindrical shape for example and a passage way for a key 10 in the body to actuate a door lock mechanism. According to the invention, the lock cylinder 3 extends adjacently to a lateral edge of the handle 2, preferably extending along the longitudinal direction from the handle 2.

In the example illustrated in the figures, and in particular in FIGS. 9 and 11, the housing 1 delimits a cavity 20 of elongate shape configured to house the handle 2 and the lock cylinder 3, disposed adjacently along the longitudinal direction inside the recess of the housing 1 but located at a distance from one another along the longitudinal direction.

In the example illustrated in particular in FIGS. 9 and 11, it is seen that the housing 1 delimits a cavity 20 of substantially elongate shape along the longitudinal direction and delimits along this longitudinal direction a main recess 22 shaped to house the handle 2 and a secondary recess 24 to house the lock cylinder 3, located in the longitudinal extension of the main recess 22.

In the sectional view of FIG. 11, it is seen for example that the main recess 22 moulds the shape of the handle 2 and is extended by the secondary recess 24 in the form of a longitudinal extension of the cavity 20 of the housing 1.

Moreover, preferably, the housing 1 comprises a compartment 26 for housing the lock cylinder 3, positioned in this example in the secondary recess 24 of the housing 1.

In the example described, the compartment 26 for housing the cylinder 3 includes a support structure 27 whereon the flap 4 is rotatably mounted about the axis of rotation 5 thereof such that, in the closing position of the flap 4, the front part 4A closes the compartment 26 and the rear part 4B closes said space 28 capable of being freed.

This compartment 26 is presented for example in the form of an internal separating wall 29 including a first side which has a surface facing the handle 2 and a second side which delimits an internal receiving seat of substantially semi-cylindrical shape complementary with the general shape of the lock cylinder 3. In this illustrated example, the internal separating wall 29 comprises the support structure 27 which supports the axis of rotation 5. For example, the support structure 27 includes two perforated flanges intended to receive the axis of rotation 5 and extending the internal wall 29 along the transverse direction.

In the example described, the axis of rotation 5 is an axis positioned on the flap 4 in order to delimit a front flap part 4A, upstream from the axis, forming a cover of the cylinder 3, and a rear flap part 4B, downstream from the axis, forming a pivoting lever of the flap 4.

Thus, in the example illustrated, the axis of rotation 5 shares the flap 4 in a so-called proximal rear part 4B as it is near the handle 2 and a so-called distal front part 4A covering the cylinder 3, as it is distant from the handle 2. In operation, preferably, the rear part 4B of the flap 4 forms the pivoting lever of the flap 4 and is configured to be folded back by pivoting about the axis 5 inside the housing 1 and towards the cylinder 3.

Preferably, the flap 4 delimits an outer face visible from outside the opening control and an inner face facing the inside of the housing 1. This inner face bears in the example described at least one bearing 30 for guiding the axis of rotation 5 in rotation and the axis of rotation 5 is preferably formed by a rod (FIG. 9).

In the embodiment illustrated, the distance between the axis of rotation 5 and a proximal end of the flap 4 (near the handle 2) is less than the distance between the axis of rotation and a distal end of the flap 4 (distant from the handle 2). In the example illustrated, the axis of rotation 5 of the flap 4 is disposed at around one-third of the dimension of the flap 4 along the longitudinal direction from the proximal end of the flap 4. The axis of rotation 5 can alternatively be substantially medial.

Furthermore, the axis of rotation 5 of the flap 4 includes an elastic return means 8 of the flap 4 in the closing position thereof. In this particular embodiment example, said return means 8 consists of a torsion spring 9 but it may be substituted by another elastic return means well-known to a person skilled in the art.

Preferably, the housing 1 comprises an inner clearance 32 extending between the lateral edge of the handle 2 and the cylinder 3 wherein the flap 4 can pivot in the opening position thereof in an erected configuration between the cylinder 3 and the lateral edge of the handle 2 freeing said space 28 to allow access to the lateral edge of the handle 2. This inner clearance 32 preferably forms a travel chamber of the flap 4 inside the housing 1, and in this example described, of the rear part 4A of the flap 4, making it possible to free the space 28.

Figure 5:
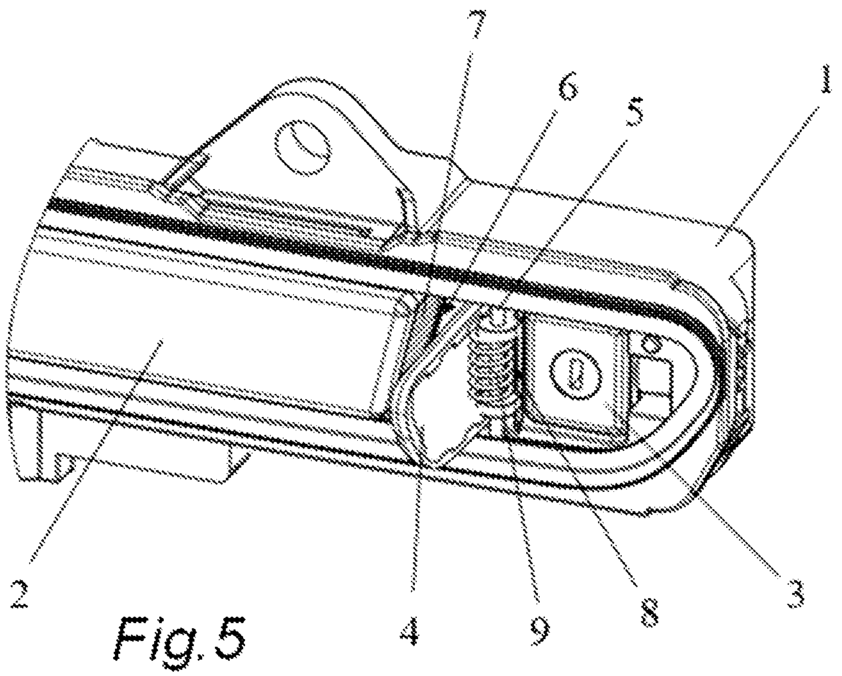
FIG. 5 is a partial perspective view of the external opening control according to the invention in the lock cylinder cover opening position with the lock cylinder inserted.

Accessorily, with reference to FIG. 3, it will be noted that, once the flap 4 is open, a key 10 can be inserted into the lock cylinder to open the lock beforehand. After opening the lock with the key 10, the operator can insert their finger between the flap 4 and the lateral edge of the handle 2 until the distal end of their finger is housed in the hollow 7 formed in the lateral edge of the handle 2 then, by pulling with their finger, gets the opening to open. Furthermore, with reference to FIGS. 4 and 5, it will be observed that the opening control according to the invention enables quick and easy assembly of the lock cylinder 3. Indeed, it is simply necessary to open the flap 4 (FIG. 4) and then insert the lock cylinder 3 in the hole formed in the housing 1 (FIG. 5).

The operation of the opening control of a vehicle opening according to the invention will now be described with reference to FIGS. 6 and 7.

Figure 6:
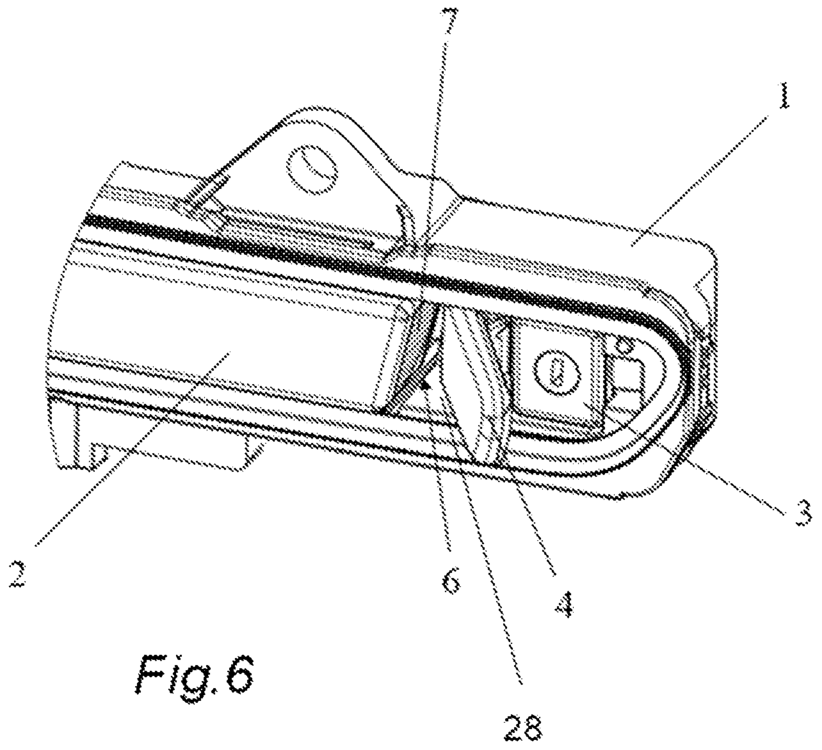
FIG. 6 is a partial perspective view of the external opening control according to the invention in the cylinder cover opening position.

With reference to FIG. 6, in the event of battery failure, the flap 4 is opened by pivoting it about its axis of rotation 5 in order to free a free space between the lateral edge of the handle 2 and said flap 4 thus making accessible the hollow 7 forming the gripping means 6 of said handle 2 which is then in the flush position thereof, wherein the handle 2 is housed completely or partially in the housing 1. In the event of the lock being closed, a key 10 is inserted in the lock cylinder 3, made accessible by opening the flap 4, and after rotating the key in the cylinder 3, the lock is opened.

Figure 7:
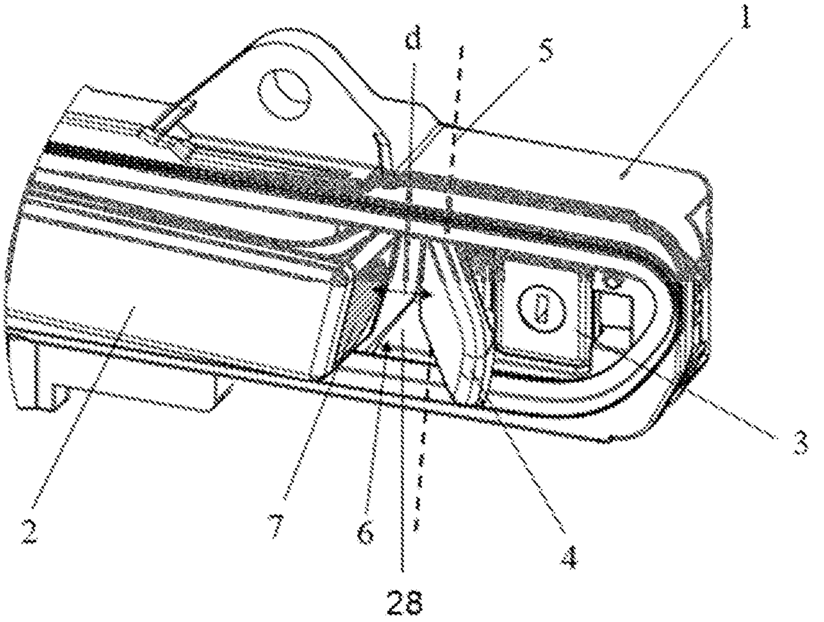
FIG. 7 is a partial perspective view of the external opening control according to the invention in the handle opening position.
Figure 8:
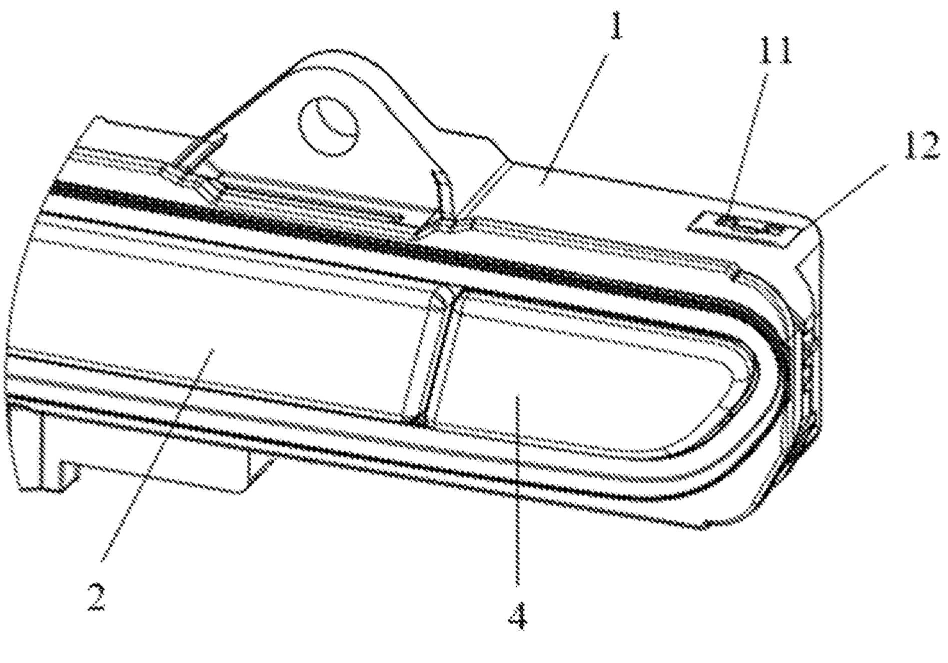
FIG. 8 is a partial perspective view of an alternative mode of execution of the external opening control according to the invention in the closed position.

Secondly, with reference to FIG. 7, the operator inserts a finger between the flap 4 and the lateral edge of the handle 2 until the distal end of their finger is housed in the hollow 7 formed in the lateral edge of the handle 2 then, by pulling with their finger, gets the handle 2 to move to the so-called ejected position thereof wherein the handle 2 extends at least partially from the housing 1 thus getting the opening to open.

According to an alternative mode of execution of the opening control of an opening according to the invention, with reference to FIGS. 8 to 11, the opening control of a motor vehicle opening according to the invention comprises, as above, a housing 1 intended to be mounted on a vehicle opening, not shown in the figures, a handle 2 rotatably mounted with respect to the housing 1 between at least a flush position wherein the handle 2 is housed completely or partially in the housing 1 and an ejected position wherein the handle 2 extends at least partially from the housing 1, said handle 2 being configured to actuate a door lock in a manner known to a person skilled in the art and therefore not shown in the figures.

Moreover, the opening control also comprises a lock cylinder 3 adjacent to the door handle 2 to lock and unlock the door lock, not shown in the figures, and a flap 4 articulated to the housing 1 and configured to cover the lock cylinder 3 while being flush with the handle 2, and, when the flap 4 is actuated by hand, exposes the lock cylinder 3. Said flap 4 is articulated about an axis of rotation 5 extending with respect to the lateral edge of the handle 2 to a distance d greater than or equal to 10 mm, and preferably greater than or equal to 15 mm, i.e. greater than or equal to the thickness of a finger, and the lateral edge of the handle 2 includes a gripping means 6 capable of receiving a member, such as a finger for example, inserted between the open flap 4 and the lateral edge of the handle 2 in order to enable the manual actuation of said handle 2 from the flush position thereof to the ejected position thereof after opening the flap 4.

Said gripping means, with reference to FIGS. 9 and 10, consists of a hollow 7 formed in the lateral edge of the handle 2 extending next to the axis of rotation 5 of the flap 4 and capable of receiving at least one finger for manually opening the handle 2. In this particular embodiment example, said hollow 7 formed in the lateral edge of the handle 2 has a substantially parallelepipedal shape and a depth greater than or equal to 6 mm. It is obvious that said hollow 7 may have any shape without for all that leaving the scope of the invention.

Moreover, the axis of rotation of the handle 2 is substantially vertical and the axis of rotation of the handle 2 is parallel with the axis of rotation 5 of the flap 4, the axis of rotation 5 of the flap 4 being thus substantially vertical. Said axis of rotation 5 of the flap 4 includes an elastic return means 8 of the flap 4 in the closing position thereof. In this particular embodiment example, said return means 8 consists of a torsion spring 9 but it may be substituted by another elastic return means well-known to a person skilled in the art.

Said opening control is distinguished from that described above in that it includes a switch 11 positioned in a recess 12 extending to the rear of the housing 1, next to the flap 4, above the lock cylinder 3, cooperating with a push-button 13 protruding on the front face of the housing 1 under the flap 4. Said switch 11 is electrically connected to the vehicle BCM, an acronym of "Body Control Module", said BCM being connected with the vehicle door locks and generates and the door locking and/or unlocking signal. Moreover, said flap 4 includes on the so-called inner face thereof, i.e. the face of the flap 4 extending next to the housing 1 in the closed position, a finger 14 capable of bearing on the push-button 13 without pushing it in. When the flap 4 is pushed in, i.e. when the flap 4 is rotated towards the housing 1 by pushing with a finger of the hand for example, the finger 14 bears on the push-button 13 and pushes in said push-button 13 to set said switch 11 to the closing position thus actuating the locking or unlocking of the doors.

Finally, it is obvious that the examples given above are merely particular illustrations in no way restrictive as to the fields of application of the invention.

The invention claimed is:

1. Opening control of a motor vehicle opening comprising:

a housing intended to be mounted on the opening, the housing comprising a compartment and a support structure, a handle having a handle lateral edge and being configured to actuate a door lock, the handle being rotatably mounted with respect to the housing between at least a flush position wherein the handle is housed completely or partially in the housing and an ejected position wherein the handle extends at least partially from the housing, a lock cylinder configured to lock and unlock the door lock, the lock cylinder being housed in the compartment, adjacent to the handle lateral edge, a flap rotatably mounted on the support structure about a rotation axis, between a closing position, wherein the flap is flush with the handle, and an opening position, the rotation axis is positioned on the flap in such a manner that the rotation axis delimits a flap front part and a flap rear part, wherein in the closing position, the flap front part being opposite of the handle lateral edge relative to the rotation axis and forming a cover for the lock cylinder while closing the compartment, and the flap rear part being between the handle lateral edge and the rotation axis and forming a pivoting lever, and wherein the rotation axis extends away from the handle lateral edge, between the handle lateral edge and the lock cylinder, in such a way that, when the flap rear part is actuated by hand, the flap rear part pivots towards the inside of the housing into the opening position between the handle lateral edge and the lock cylinder thereby freeing a space between the handle lateral edge and the lock cylinder, while the flap front part exposes the lock cylinder, the handle lateral edge includes a gripping means, made accessible by freeing the space, the gripping means being capable of receiving a member inserted into the space, between the flap rear part and the handle lateral edge, in order to enable a manual actuation of the handle from the flush position to the ejected position when the flap is in the opening position, while the handle rear part closes the space in the closing position, a distance between the rotation axis and a proximal end of the flap near the handle is less than a distance between the rotation axis and a distal end of the flap distant from the handle.

2. Opening control according to claim 1, wherein, in the opening position thereof, the flap extends inside the housing in a configuration erected between the lateral edge of the handle and the lock cylinder, protruding partially from the housing.

3. Opening control according to claim 1, wherein the housing comprises an inner clearance extending between the handle lateral edge and the lock cylinder wherein the flap can pivot in the opening position thereof in an erected configuration between the lock cylinder and the handle lateral edge freeing said space to allow access to the handle lateral edge.

4. Opening control according to claim 1, wherein, in the closing position, the flap extends flush in the longitudinal extension of the handle in the flush position thereof.

5. Opening control according to claim 1, wherein, the flap extends adjacent to the handle.

6. Opening control according to claim 1, wherein the space freed between the handle lateral edge and the open flap is sized to allow the insertion of an adult user's finger.

7. Opening control according to claim 1, wherein the gripping means consists of a hollow formed in the lateral edge of the handle capable of receiving at least one finger for manually opening the handle.

8. Opening control according to claim 7, wherein the hollow formed in the lateral edge of the handle has a substantially parallelepipedal shape.

9. Opening control according to claim 7, wherein the hollow formed in the lateral edge of the handle has a depth greater than or equal to six millimetres.

10. Opening control according to claim 1, wherein the axis of rotation of the handle is parallel with the axis of rotation of the flap.

11. Opening control according to claim 1, wherein the axis of rotation of the flap includes an elastic return means of the flap in the closing position thereof.

12. Opening control according to claim 1, wherein the distance separating the lateral edge of the handle and the axis of rotation of the flap is greater than or equal to 10 mm.

13. Opening control according to claim 1, including a switch electrically connected to a vehicle BCM and positioned in a recess extending to a rear of the housing, next to the flap, above the lock cylinder, cooperating with a push-button protruding on a front face of the housing under the flap which includes on a so-called inner face thereof a finger capable of bearing on the push-button when the flap is in the closing position.

14. Opening control according to claim 1, wherein the housing delimits a cavity of substantially elongate shape along a longitudinal direction and the cavity comprises, along the longitudinal direction, a main recess shaped to house the handle and a secondary recess shaped to house the lock cylinder, the secondary recess being located in a longitudinal extension of the main recess.

15. Opening control according to claim 14, wherein the compartment is positioned in the secondary recess.

16. Opening control according to claim 1, wherein the compartment comprises an internal separating wall including a first side facing the handle and a second side delimiting an internal receiving seat complementary with the lock cylinder.

17. Opening control according to claim 16, wherein the compartment includes a support structure whereon the flap is rotatably mounted about the rotation axis, and the internal separating wall comprises said support structure.

* * * * *